(12) United States Patent
Passaro (10) Patent No.: US 6,513,316 B1
(45) Date of Patent: Feb. 4, 2003

(54) METHOD AND APPARATUS FOR FACETING HOLLOW AND SOLID CHAINS

(75) Inventor: Jorge Rolando Passaro, Lima (PE)

(73) Assignee: Tibor Schwartz, Brooklyn, NY (US)

( * ) Notice: Subject to any disclaimer, the term of this patent is extended or adjusted under 35 U.S.C. 154(b) by 39 days.

(21) Appl. No.: 09/839,823

(22) Filed: Apr. 20, 2001

(51) Int. Cl.[7] .............................. B21L 5/02; B21L 15/00
(52) U.S. Cl. ............................................. 59/35.1; 59/80
(58) Field of Search .................. 59/3, 35.1, 80, 59/82

(56) References Cited

U.S. PATENT DOCUMENTS

| | | | |
|---|---|---|---|
| 4,059,000 A | | 11/1977 | Bodnar .......................... 72/197 |
| 4,493,183 A | | 1/1985 | Bucefari et al. ................ 59/16 |
| 4,651,517 A | | 3/1987 | Benhamou et al. ............ 59/80 |
| 4,754,535 A | | 7/1988 | Valtiero ........................ 29/335 |
| 5,125,225 A | | 6/1992 | Strobel ........................ 59/35.1 |
| 5,412,935 A | * | 5/1995 | Rozenwasser ................. 59/80 |
| 5,425,228 A | | 6/1995 | Hillel ............................. 59/80 |
| 5,471,830 A | | 12/1995 | Gonzales ....................... 59/80 |
| 5,526,639 A | * | 6/1996 | Gonzales ..................... 59/35.1 |
| 5,535,583 A | | 7/1996 | Holzer et al. ................ 59/35.1 |
| 5,605,038 A | * | 2/1997 | Rozenwasser ................. 59/80 |
| 5,737,910 A | | 4/1998 | Rozenwasser ............... 59/35.1 |
| 5,911,677 A | * | 6/1999 | Kupelian ..................... 59/35.1 |
| 5,966,922 A | * | 10/1999 | Cossio ........................ 59/35.1 |
| 6,092,358 A | | 7/2000 | Grosz ......................... 59/35.1 |
| 6,223,516 B1 | * | 5/2001 | Falcon et al. .................. 59/80 |

FOREIGN PATENT DOCUMENTS

| | | | |
|---|---|---|---|
| EP | 0470937 | 7/1991 | .......... A44C/11/00 |
| EP | 0542399 | 5/1992 | .......... A44C/11/00 |
| JP | 7299602 | 5/1994 | |
| WO | 9309897 | 6/1992 | |

* cited by examiner

Primary Examiner—David Jones
(74) Attorney, Agent, or Firm—Steven Horowitz

(57) ABSTRACT

A method and apparatus for making faceting hollow or solid jewelry chains involves subjecting the chain wrapped around the drum of an ice lathe to the rotary motion of a cutting wheel essentially perpendicular to the length of the drum. The cutting wheel has a plurality of teeth and is fitted at the end of an arbor held by two bearings clamped to a flat steel platform which is adapted to the advance mechanism arm of the ice lathe. An electric motor mounted on the flat platform turns a shaft that is fitted with pulleys to allow the rotary power of the shaft to be transmitted to the arbor. The direction of the turning of the cutting wheel determines whether the cutting wheel is used to flatten and facet a hollow chain link or to cut a solid chain link. The cutting wheel's diameter and quantity of teeth is variable.

41 Claims, 6 Drawing Sheets

FIG. 2

METHOD AND APPARATUS FOR FACETING HOLLOW AND SOLID CHAINS

The field of this invention is the manufacture of jewelry chains and more particularly the manufacture of hollow and solid chains.

BACKGROUND OF THE INVENTION AND DISCUSSION OF THE PRIOR ART

Faceting a jewelry chain means creating flat surfaces or facets in the links of the jewelry chain. For this purpose of faceting, jewelry chains may be divided into two types: "hollow chains" in which the links are hollow and "solid chains" in which the links are solid. It is known that for hollow jewelry chains, faceting involves flattening a curved portion of the links of the chain to create a facet. It is similarly, well known that for solid jewelry chains, faceting involve actually cutting the links, a process that essentially involves removing a segment or a slice of the curved surface of the link to yield a remaining link with a facet, or a flat face in a portion of it. One would not want to cut hollow chains since that would yield holes exposed in the links. Accordingly, different processes are used for faceting solid chains than for faceting hollow chains. Whatever apparatus or tool would be used for one process would not be used for the other and vice versa.

One purpose of faceting is to create flat surfaces in the links that are shiny and reflect light for a sparkling effect.

Various methods of making facets on jewelry chains are known including employing incremental deformative thrusts of blunt force against an outer wall portion to deform the links and provide a flattened surface, as in U.S. Pat. No. 5,797,258 to Strobel, or using a continuous rolling force by means of a pressure roller against the links to flatten the outer curved wall and form a facet that way.

It has been noted that the main purpose of the use of hollow as opposed to solid chains is simply the reduction in the use of the metal material and hence a reduction in the cost. It may be desirable in certain cases to manufacture chains having only a portion of whose links are hollow and the remainder solid. It would be advantageous to be able to perform faceting of such a chain with one apparatus to avoid the inconvenience and difficulty of switching from one method and apparatus to another.

The known methods and apparatus of the prior art are not sufficiently versatile with one mechanism to be able make a variety of different kinds and sizes of facets in a jewelry chain with minimal adjustment. In addition the prior art methods do not use make use of the regularity and convenience of motors. In addition, the known methods are not applicable to both hollow and solid chains and they suffer from various other drawbacks and disadvantages. The known methods and apparatuses of the prior art also suffer from the fact that instead of perfectly flat facets being created, sometimes curved faces result from the pushing against the jewelry while it is turning while on the drum. A further disadvantage is the accidental ripping of the jewelry chain.

The present invention offers a new method and apparatus of making facets in both hollow and solid chains and thereby overcomes the disadvantages of the prior art while also offering new and additional advantages.

IMPORTANT OBJECTS AND ADVANTAGES

The following important objects and advantages of the present invention are:

(1) to provide a method of faceting jewelry chains that is applicable to both hollow and solid chains and to chains partly made of solid links and partly made of hollow links;

(2) to provide a method of faceting jewelry chains that are made of curved chain links that are either hollow or solid;

(3) to provide a method of faceting hollow jewelry chains applicable to jewelry chains that have portion of the links that are hollow and a portion of the links that are solid;

(4) to provide a method of faceting solid jewelry chains applicable to jewelry chains that have portion of the links that are hollow and a portion of the links that are solid;

(5) to provide a method of faceting jewelry chains that makes use of the power of an electric motor to control the speed and direction of the cutting wheel that strikes the links;

(6) to provide a method of faceting jewelry chains that employs a cutting wheel that either flattens hollow chain links or cuts solid chain links depending upon the direction of the rotation of the cutting wheel;

(7) to provide a method of faceting jewelry chains that employs a cutting wheel that strikes each link in the jewelry chain multiple times;

(8) to provide a method and apparatus of faceting jewelry chains that allows the different size and shaped facets to be made merely by varying the number and teeth in the cutting wheel and the diameter of the cutting wheel;

(9) to provide a method and apparatus of faceting jewelry chains that operates in conjunction with an ice lathe by adding to the ice lathe a platform having affixed thereto an electric motor that turns a shaft connected by pulleys to a freely rotating arbor holding a cutting wheel, the cutting wheel perpendicular to the drum of the ice lathe holding the chain; and (10) to provide a method and apparatus of faceting jewelry chains wherein flat facets are created without bulging and without accidental breaking of the jewelry chain.

DETAILED DESCRIPTION OF THE PREFERRED EMBODIMENT

In this patent application the term "link", when referring to links that appear in a hollow chain refers broadly to such a link made either of a single loop of rigid material or made of two or more side by side loops, or arranged differently. In addition the term "link", whether in a hollow or solid chain, refers to any link of any shape and regardless of how that link is connected to the adjacent link.

In order to better understand the present invention in conjunction with the drawings of FIGS. 1–7, the overall apparatus of the present invention has been assigned reference numeral 10 and its elements are described and assigned the reference numerals identified below.

As best seen in FIGS. 1–7, there is herein disclosed a method and apparatus for making faceted hollow jewelry chains having a plurality of links.

Apparatus 10 for making faceted hollow jewelry chains, includes ice lathe 20 including a rotatable drum 22 and an advance mechanism 24 for advancing a tool horizontally along the length of the drum 22. Jewelry chain 30 has a plurality of hollow curved chain links 33 has been placed around drum 22 so that it is tightly would around drum 22. Apparatus 10 may or may not include jewelry chain 30.

Electric motor 40 is mounted on a flat steel platform 50. Using well known means relating to lathes, platform 50 is adapted to the advance mechanism 24 of the ice lathe 20 so that platform 50 advances lengthwise across drum 22 at a rate suitable for cutting wheel 48 (described below) to continuously engage chain links 33 as the drum 22 rotates.

Electric motor 40 preferably although not necessarily has one-half horsepower and is a three phase industrial use electric motor. Motor 40 has a variable r.p.m., preferably although not necessarily in the range of 2,000 to 3,000 revolutions per minute.

Figure 7:
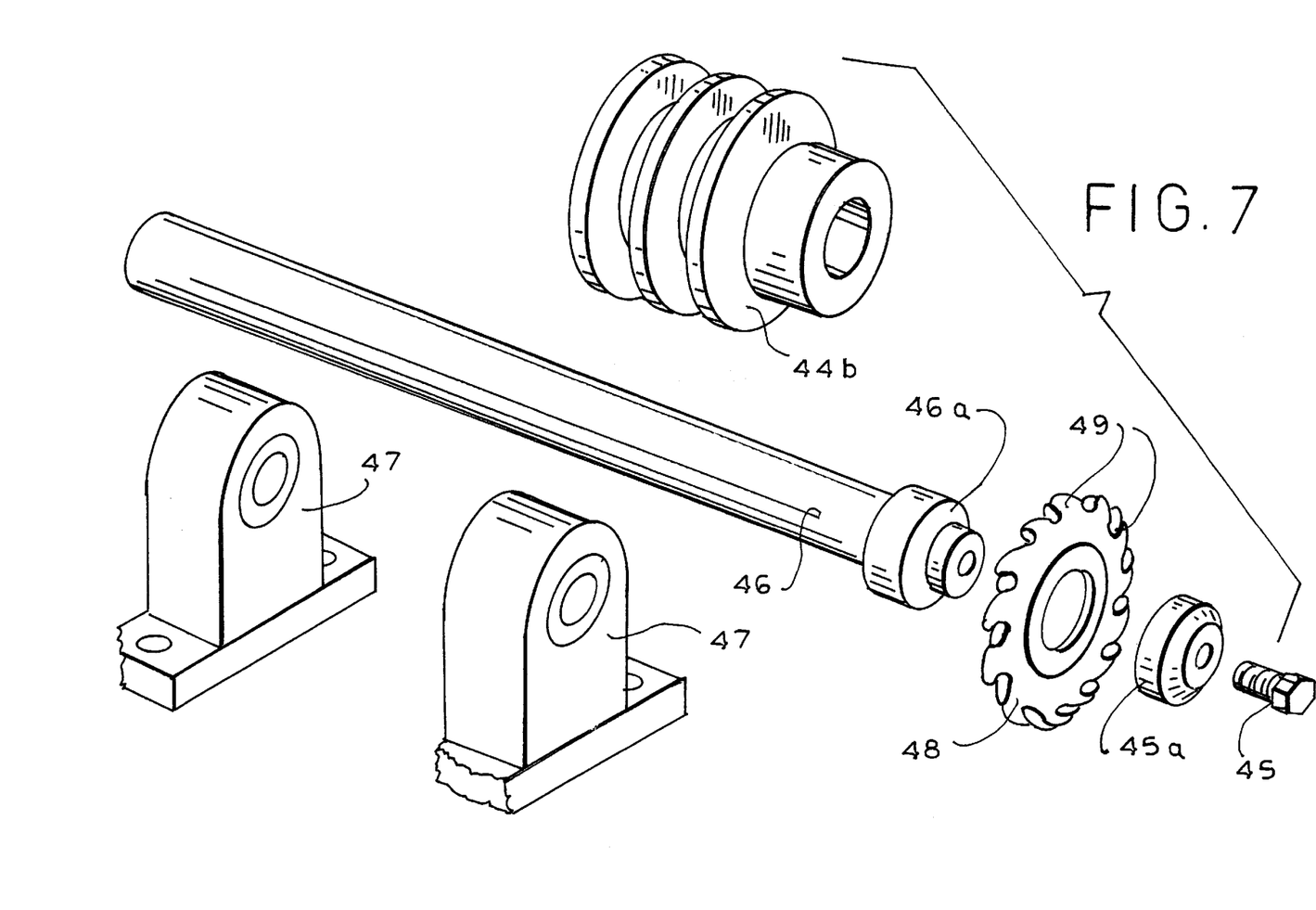
FIG. 7 is an exploded perspective view of the bearings, the arbor and a pulley of the present invention.

Electric motor 40 is fitted to turn a double channel aluminum shaft 42. Shaft 42 is fitted with a pulley 44a that can transmit a rotary motion of the shaft 42 to an arbor 46 fitted with a second pulley 44b. Typically, although not necessarily, pulleys 44a, 44b are one-half inch "V"-shaped pulleys. Arbor 46 is able to rotate freely because arbor 46 is held in place loosely by bearings 47 that are clamped to the platform 50. Arbor 46 has affixed to it a cutting wheel 48 having a plurality of teeth 49. Arbor 46 is positioned so that the cutting wheel 48 is substantially perpendicular to the drum 22. Preferably, although not necessarily, cutting wheel 48 is fitted to an end 46a of arbor 46. As best illustrated in FIG. 7, cutting wheel 48 can be attached to arbor 46 using well known means such as by attachment at an end 46a of arbor 46 using a nut 45a and screw 45b.

Figure 1:
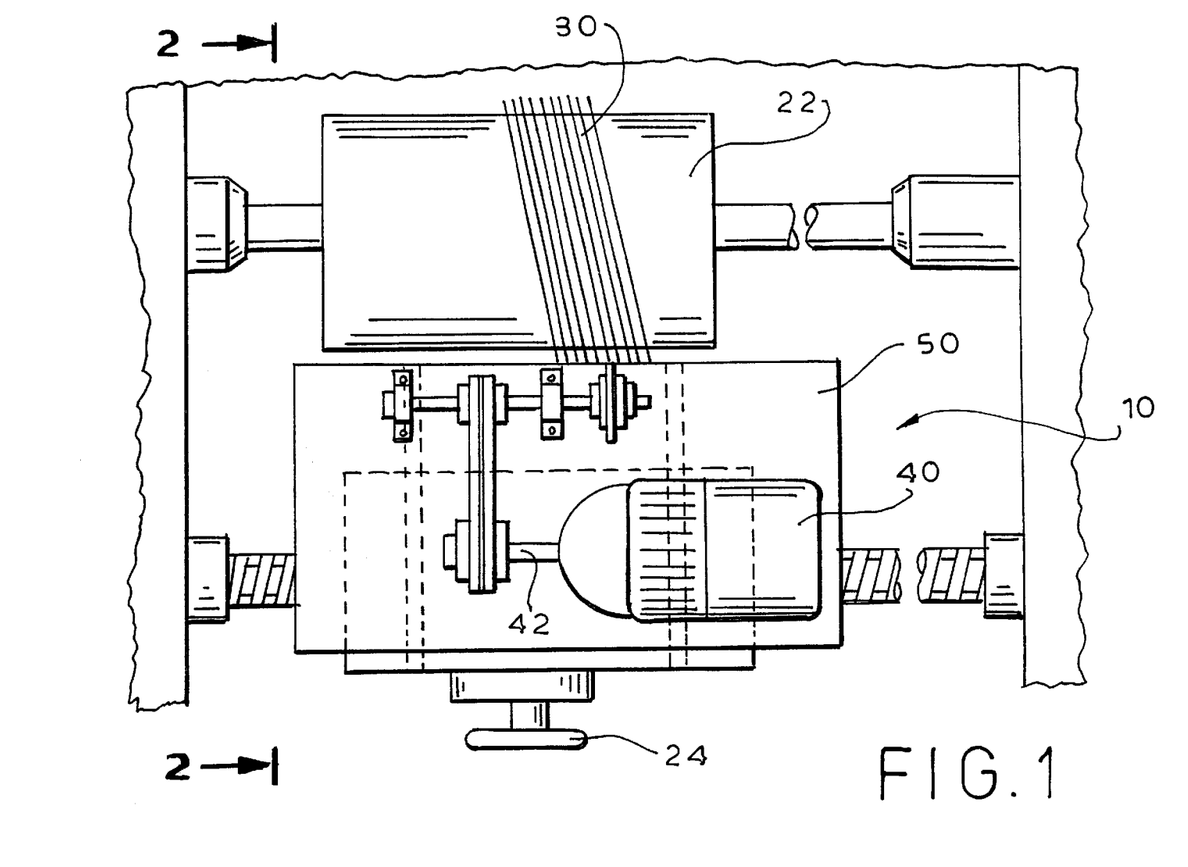
FIG. 1 is a top plan view of the apparatus of the present invention.
Figure 2:
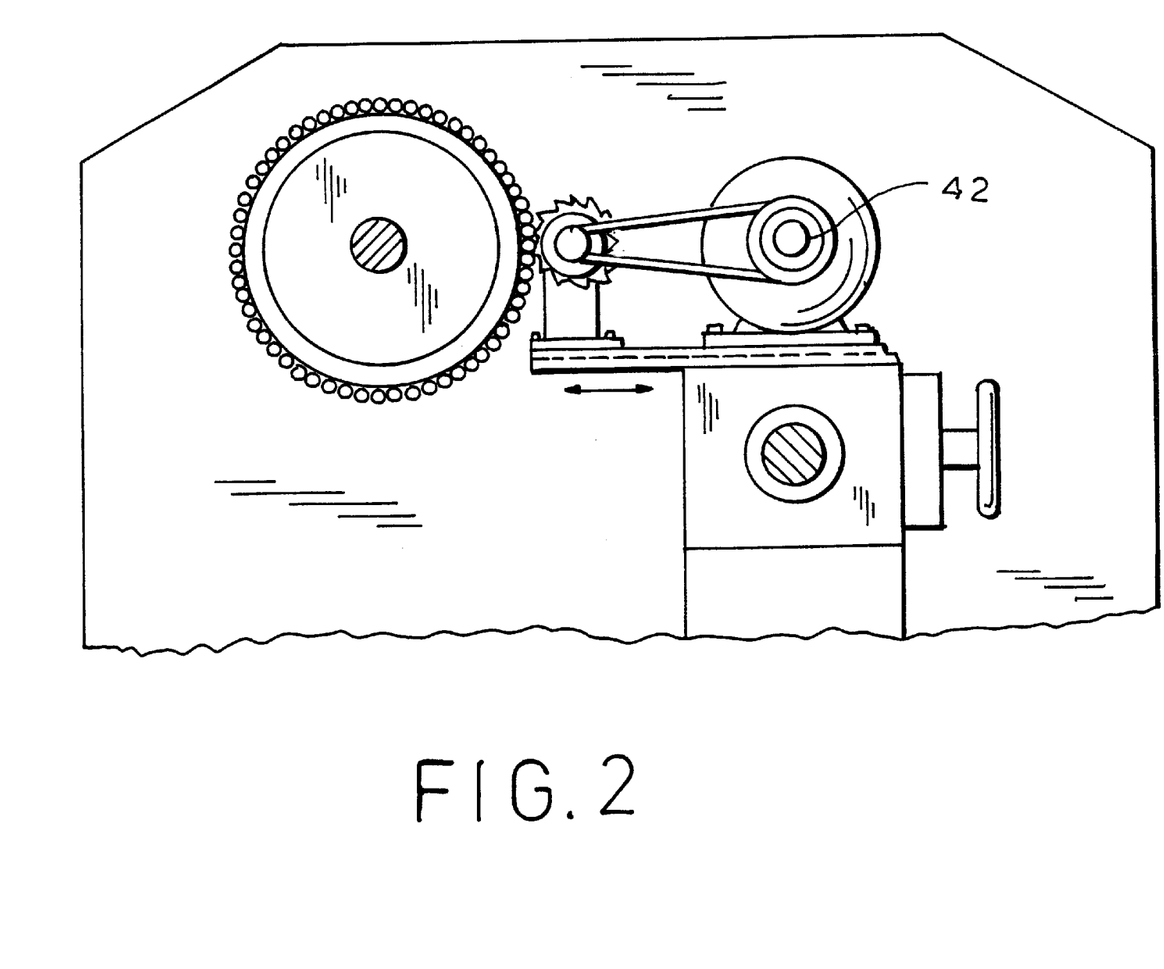
FIG. 2 is a vertical sectional view of the apparatus of the present invention.
Figure 3:
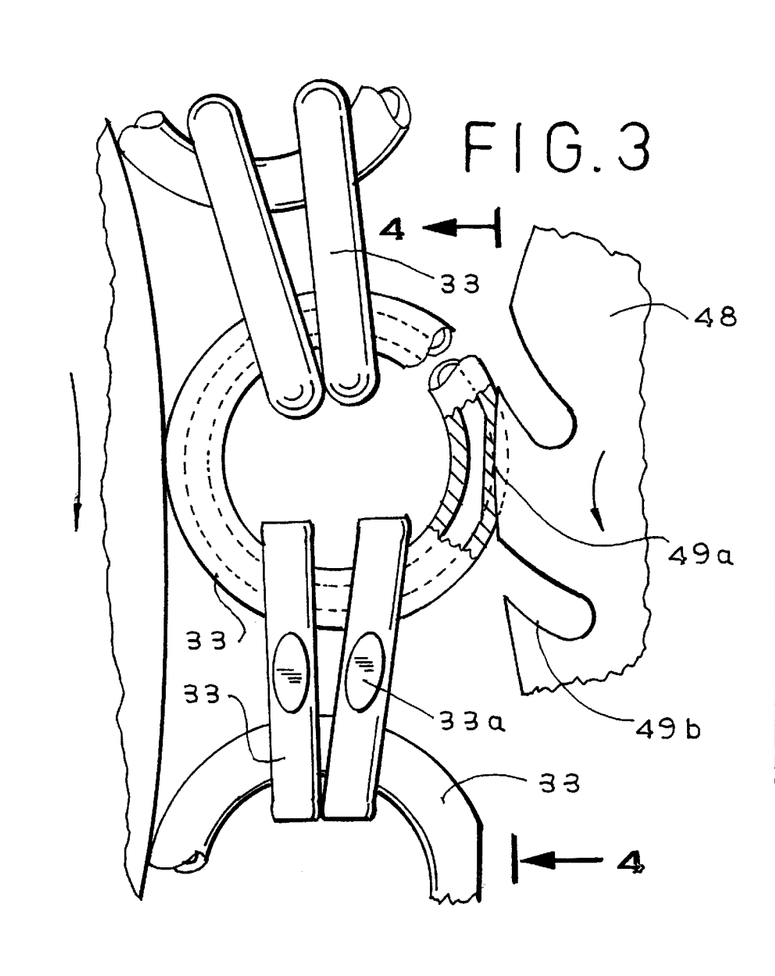
FIG. 3 is a greatly enlarged fragmentary view of the cutting wheel of the present invention flattening a hollow link of a jewelry chain.
Figure 4:
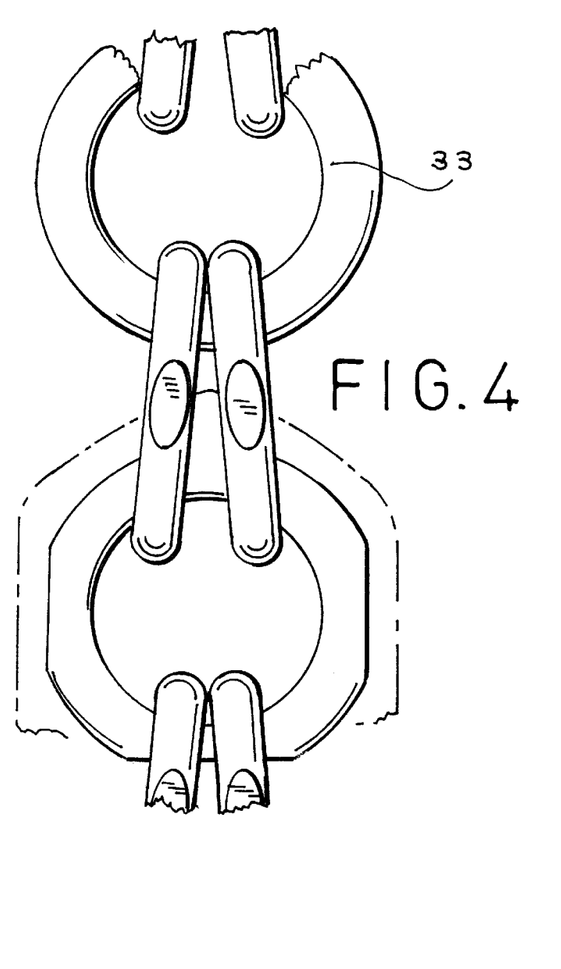
FIG. 4 is a vertical sectional view taken along line 4—4 in FIG. 3.

Because of the non-symmetrical shape of the teeth 49 of cutting wheel 48, the rotation direction of the shaft 42 governed by electric motor 40 controls the rotation direction of the cutting wheel 48 and hence of the teeth 49 of cutting wheel 48. When motor 40 turns shaft 42 in a forward direction then arbor 46 is rotated in a forward direction and cutting wheel 48 rotates in a forward direction, the result being that, as seen in FIG. 3, an outer wall edge 49a of the cutting wheel 48 repeatedly strikes the links as the drum 22 turns and the cutting wheel 48 rotates. This causes the each link 33 in jewelry chain 30 to have a flattened surface 33a or facet 33a.

Figure 5:
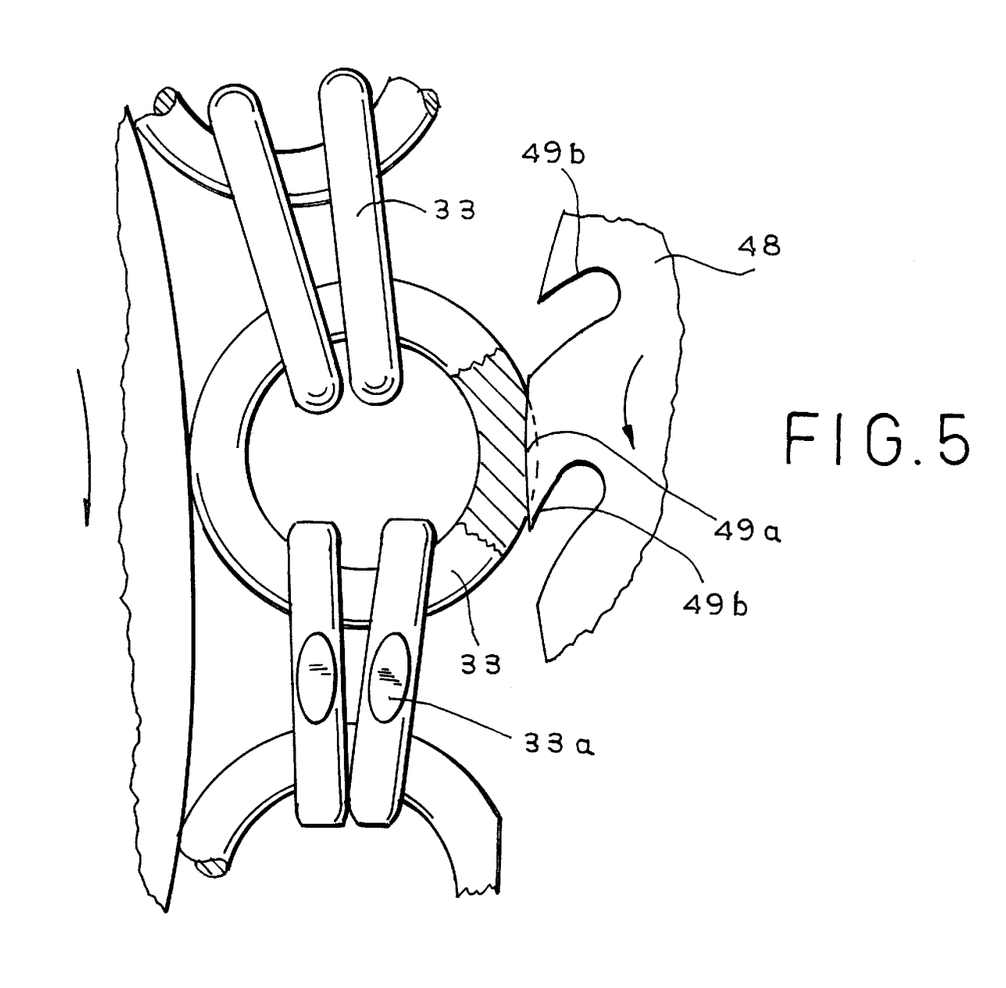
FIG. 5 is a view similar to FIG. 3 but wherein the cutting wheel of the present invention is cutting a solid link of a jewelry chain.
Figure 6:
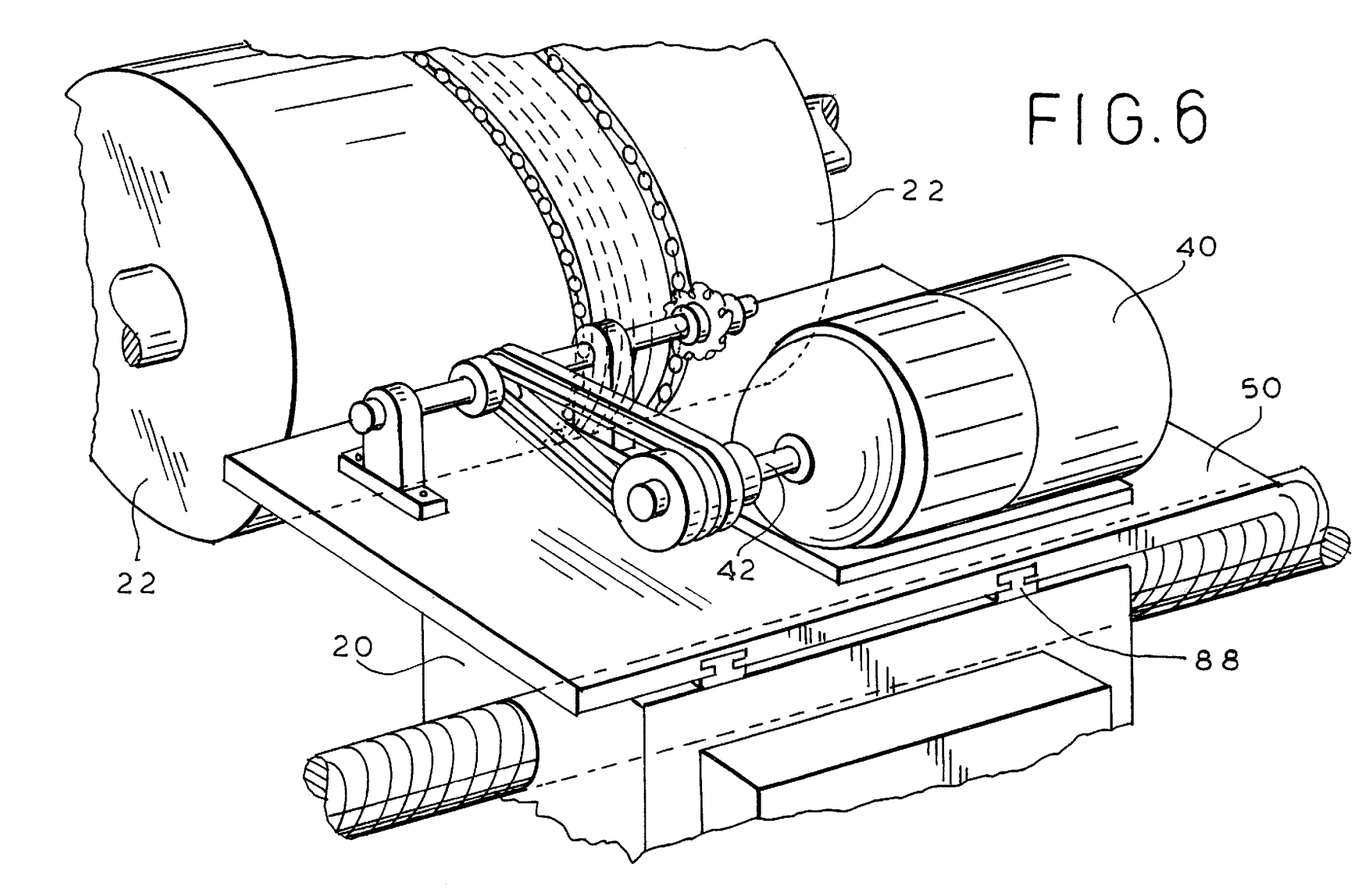
FIG. 6 is a perspective view of the apparatus of the present invention employing the method of the present invention.

If, on the other hand motor 40 turns shaft 42 in a reverse direction then arbor 46 is rotated in a reverse direction and cutting wheel 48 is rotated in a reverse direction, the result being that, as seen in FIG. 5, the sharp edge 49b of the teeth 49 of the cutting wheel 48 strikes each of the plurality of links and in fact cut off a portion of each of the links as the drum 22 turns and the cutting wheel 48 rotates. This reverse direction is precisely what is used when faceting solid chains using the present invention. As a consequence of cutting wheel 48 rotating in the reverse direction, as described and as best seen in FIG. 5, each solid link 33 in jewelry chain 30 receives a facet 33a or flat surfaces. It should be noted that although FIG. 3 and FIG. 5 are similar views they are not necessarily consistent with one another and may reflect the depiction of different cutting wheels 48 or separate apparatuses 10. This was done so that the viewer could both see these figures depicting a downward motion by the cutting wheel 48 even though FIG. 3 represent a forward rotary motion while FIG. 5 reflects a reverse rotary motion of cutting wheel 48.

In sum, the "cutting" mode of the cutting wheel 48 is used for solid chains 33 whereas the flattening mode of the cutting wheel 48 is used for hollow link chains 33. Merely by setting the direction of electric motor 40 with the flick of a switch, the method and apparatus of the present invention is adjusted from faceting hollow link chains 33 to faceting solid chains 33 or vice versa.

Setting or adjustment means 88 is used to precisely set a distance between the cutting wheel and the chain wound around the drum so that a rotary motion of the cutting wheel makes facets in a plurality of links of the chain. Setting means 88 is a well known means of setting that typically exists on ice lathes to govern the distance between the drum (or more precisely the chain on the drum) and the tool controlled by the advance mechanism and may be located on a base of the ice lathe 20.

It may be readily understood from the description of the apparatus of the present invention that in order to use the method of the present invention to make facets 33a on a plurality of links 33 of a hollow jewelry chain 30, the following steps are described. The jewelry chain 30 having hollow curved chain links 33 is tightly wound around a drum 22 of an ice lathe. Using well known methods, the user freezes the drum 22 of the ice lathe and applies water to the chain upon the frozen drum until the water is frozen so that the chain 30 is fixed in place on drum 22. Electric motor 40 is turned on. Motor 40 is mounted on flat platform 50, the platform adapted to an advance mechanism 24 of the ice lathe. When motor 40 is running in a forward direction, determined by a switch means (not shown) on motor 40 or in any other suitable place, motor 40 automatically turns shaft 42 in a forward direction. Shaft 42 is fitted with a pulley 42a so as to transmit a forward rotary motion of said shaft to an arbor 46 fitted with a second pulley 42b, the arbor 46 held by bearings 47 clamped or otherwise affixed to the platform. Arbor 46 has affixed to it cutting wheel 48. Arbor 46 is positioned so that cutting wheel 48 is substantially perpendicular to drum 22. Drum 22 is rotated and the advance mechanism 24 of the ice lathe is activated. Setting means 88 is used to precisely set a distance between the cutting wheel 48 and the chain 30 wound around drum 22 so that a rotary motion of cutting wheel 48 makes facets 33a in a plurality of links 33 of the chain.

In order to use the method of the following invention to create facets 33a on a plurality of links 33 of a solid jewelry chain 33, the identical steps are carried out with the only difference being that when setting the electric motor 40 said motor is set to turn shaft 42 in the reverse rotational direction rather than in a forward direction. Changing the direction of the mechanical rotational energy that is the output of motor 40 is accomplished by "flipping" a simple switch on motor 40 or by any other well known means.

Accordingly, it can be readily appreciated that the method and apparatus of the present invention can be used to facet hollow as well as solid jewelry chains and can be used to facet chains 30 having a combination of hollow links 33 and solid links.

As can further be appreciated, the method of the present invention can also be described as a new use for an electric motor 40 that is mounted on a flat platform 50 and fitted to turn a shaft 42 that is fitted with a pulley 44a that can transmit a rotary motion (in a forward direction for hollow links 33 and in a reverse direction for solid links 33) of the shaft 42 to an arbor 46 fitted with a second pulley 44b, wherein the arbor 46 is held by bearings affixed to the platform 50, and wherein the arbor 46 transmits the rotary motion to a cutting wheel 48 that is affixed to the arbor 46, the new use allowing the apparatus to make facets on a jewelry chain 30 that has a plurality of curved chain links 33 that are hollow (or solid). The steps of the new use are tightly winding the jewelry chain 30 having a plurality of hollow curved chain links 33 around a rotatable drum 22 of an ice lathe that has an advance mechanism; freezing the drum 22, applying water to the chain 30 upon the frozen drum 22 until the water is frozen so that the chain 30 is fixed in place, adapting the platform 50 to an advance mechanism 24 of the ice lathe, turning on the electric motor 40 so that the electric motor 40 turns the shaft 42 in a forward direction and a forward rotary motion of said shaft 42 is transmitted to the arbor 46 and to the cutting wheel 48, and said arbor 46 positioned so that the cutting wheel 48 is substantially perpendicular to the drum 22 and rotates in a forward direction, the cutting wheel 48 having a plurality of teeth 49, rotating the drum 22 and activating the advance mechanism 24 of the ice lathe, and using setting means 88 to precisely set a distance between the cutting wheel 48 and the chain 30 wound around the drum 22 so that a rotary motion of the cutting wheel 48 makes facets in each of a plurality of links 33 of the chain 30.

As before, to create facets 33a on a plurality of links 33 of a solid jewelry chain 33 the identical steps are carried out with the only difference being that when setting the electric motor 40 said motor is set to turn shaft 42 in the reverse rotational direction rather than in a forward direction.

It should be noted that the method of the present invention has been described in terms of its applicability to chains 30 having links 33 that are curved. Typically, faceting is conducted on such chains 30. It can be appreciated that the present invention need not be limited to curved link chains, however, but can be applied to chains having any shaped link that when flattened or cut produces a facet.

The speed of the electric motor 40 is variable. Motor 40 can be set to a range of revolutions per minute (r.p.m.), typically approximately 2000 to 5000 rpm. Because of this and the fact that the lathe 20 moves slowly, each link 33 in chain 30 is struck numerous times by cutting wheel 48. This ensures the regularity and precision of the work product facets 33a- and the smoothness of facets 33a. Flat surfaces 33a and not curved surfaces are created and the jewelry chain 30 is not accidentally ripped during the process of faceting. By adjusting the speed of motor 40 using well known means on motor 40 or any other suitable means, the number of times each link 33 is struck can be controlled.

Furthermore, cutting wheel 48 is easily removable and replaceable with a different cutting wheel 48 of a different diameter and/or having a different number of teeth 49. As a result the size of the facets 33a on the links 33 as well as other characteristics of or relating to the facets 33a can be easily varied using the method and apparatus of the present invention. If a flattened link 33 that was previously a curved link 33 is flattened so that a facet 33a is created on link 33, the distance from the smooth face of the facet 33a to a line tangent to an imaginary curved link 33 that previously existed at the point where the curved link 33 was struck to be made flat shall herein be referred to as the "degree of flatness" or "height of flatness". The other characteristics of or relating to the facets 33a that can be varied may include the degree of flatness (as that term is defined) and the shape of the facet. The degree of flatness may also be varied by the speed of the motor 40.

In accordance with the method of the present invention, after commencing the cutting wheel's 48 contact with the links 33 in chain 30, that is after a few seconds of operation of the cutting wheel 48 on the links 33, the process is halted by turning off electric motor 40, drum 22 and by resetting setting means 88 so that cutting wheel 48 is moved away from drum 20. The purpose is to check the results of the faceting process. That is, one or more links 33 that have been faceted are closely examined to see if the faceting process is operating satisfactorily and that the size and/or any other characteristic of or relating to the facets 33 being created are satisfactory. Satisfactory may be determined by an appropriate well known standard used in the jewelry manufacturing industry. If it is determined that it is satisfactory, the process is restarted by turning drum 22 on, turning electric motor 40 on and by readjusting setting means 88 to the previous setting so that cutting wheel 48 engages links 33 again. If it is determined that it is not satisfactory, then the appropriate adjustment is made to correct an error in an element of the operation of the method or apparatus 10 of the present invention such as in the size of the diameter of cutting wheel 48, the design of cutting wheel 48, the distance controlled by setting means 88, or in any other variable, in accordance with the skills of jewelry manufacturers and then the motor 40 and drum 22 are turned on again and the setting means 88 is adjusted to move cutting wheel 48 to strike the links 33.

Jewelry chain 30 may be made of any suitable well known material such as gold, silver or any other suitable hard material that is malleable under intense pressure.

It is to be understood that while the method and apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A method of making facets on a jewelry chain that has a plurality of chain links that are either hollow or solid, comprising the steps of:

(a) tightly winding a jewelry chain having a plurality of curved chain links around a drum of an ice lathe, said curved chain links being hollow or solid;

(b) freezing the drum, (c) applying water to the chain upon the frozen drum until the water is frozen so that the chain is fixed in place, (d) turning on an electric motor that is mounted on a flat platform, the platform adapted to an advance mechanism of the ice lathe, the electric motor turning a shaft fitted with a pulley so as to transmit a rotary motion of said shaft to an arbor fitted with a second pulley, said arbor held by bearings affixed to the platform, said arbor having affixed to it a cutting wheel, and said arbor positioned so that the cutting wheel is substantially perpendicular to the drum, the cutting wheel having a plurality of teeth, said electric motor and said cutting wheel rotating in a forward direction for striking and flattening a plurality of chain links that are hollow and said electric motor and said cutting wheel rotating in a reverse direction for striking and cutting a plurality of chain links that are solid, (e) rotating the drum and activating the advance mechanism of the ice lathe, (f) precisely setting a distance between the cutting wheel and the chain wound around the drum so that a rotary motion of the cutting wheel makes facets in each of a plurality of links of the chain.

2. A method of making faceted hollow jewelry chains, comprising the steps of:

(a) tightly winding a jewelry chain having a plurality of hollow curved chain links around a drum of an ice lathe;

(b) freezing the drum (c) applying water to the chain upon the frozen drum until the water is frozen so that the chain is fixed in place, (d) turning on an electric motor that is mounted on a flat platform, the platform adapted to an advance mechanism of the ice lathe, the electric motor turning in a forward direction a shaft fitted with a pulley so as to transmit a forward rotary motion of said shaft to an arbor fitted with a second pulley, said arbor held by bearings affixed to the platform, said arbor having affixed to it a cutting wheel, and said arbor positioned so that the cutting wheel is substantially perpendicular to the drum and rotates in a forward direction, the cutting wheel having a plurality of teeth, (e) rotating the drum and activating the advance mechanism of the ice lathe, (f) precisely setting a distance between the cutting wheel and the chain wound around the drum so that a rotary motion of the cutting wheel makes facets in each of a plurality of links of the chain.

3. The method of claim 2, wherein an outer wall edge of the cutting wheel strikes each of the plurality of links.

4. The method of claim 3, wherein the outer wall edge of the cutting wheel strikes each of the plurality of links multiple times.

5. The method of claim 3, wherein by varying the diameter and quantity of teeth of the cutting wheel one can vary the size and shape of the facets made in each of the plurality of links.

6. The method of claim 3, wherein the method includes an additional step of shutting off the electric motor and the drum, adjusting the setting means to move the cutting wheel from the links, closely examining one or more links that have been faceted, deciding if the faceting is satisfactory and if the faceting is satisfactory restarting the electric motor and the drum and adjusting the setting means to a previous setting so that the cutting wheel strikes the links and if the faceting is not satisfactory making an adjustment to correct an error and restarting the electric motor and the drum and adjusting the setting means so that the cutting wheel strikes the links.

7. The method of claim 2, wherein the step of turning on an electric motor involves turning on an electric motor that has one-half horsepower and has a variable r.p.m.

8. The method of claim 2, wherein the step of turning on an electric motor involves turning on an electric motor that has has between approximately 2000 and approximately 5000 revolutions per minute.

9. The method of claim 2, wherein the cutting wheel is fitted to an end of the arbor.

10. The method of claim 2, wherein the shaft is a double channel aluminum shaft.

11. The method of claim 2, wherein the pulley and the second pulley are half inch "V" pulleys.

12. Method for making facets on solid jewelry chains having a plurality of links, comprising the steps of:

(a) tightly winding a jewelry chain having solid curved chain links around a drum of an ice lathe;

(b) freezing the drum, (c) applying water to the chain upon the frozen drum until the water is frozen so that the chain is fixed in place, (d) turning on an electric motor mounted on a flat platform, the platform adapted to an advance mechanism of the ice lathe, the electric motor turning a shaft that is fitted with a pulley so as to transmit a reverse rotary motion of said shaft to an arbor fitted with a second pulley, said arbor held by bearings affixed to the platform, said arbor having affixed to it a cutting wheel, and said arbor positioned so that the cutting wheel is substantially perpendicular to the drum, the cutting wheel having a plurality of teeth and the rotating in a reverse direction so that a sharp edge of the teeth of the cutting wheel strikes the links, (e) rotating the drum and activating the advance mechanism of the ice lathe (f) precisely setting a distance between the cutting wheel and the chain wound around the drum so that a rotary motion of the cutting wheel cuts off a portion of a link of each of a plurality of links of the chain to create a facet on each of the plurality of links of the chain.

13. The method of claim 12, wherein an outer wall edge of the cutting wheel strikes each of the plurality of links.

14. The method of claim 13, wherein the outer wall edge of the cutting wheel strikes each of the plurality of links multiple times.

15. The method of claim 13, wherein by varying the diameter and quantity of teeth of the cutting wheel one can vary the size and shape of the facets made in each of the plurality of links.

16. The method of claim 13, wherein the method includes an additional step of shutting off the electric motor the drum and adjusting the setting means to move the cutting wheel from the links, closely examining one or more links that have been faceted, deciding if the faceting is satisfactory and if the faceting is satisfactory restarting the electric motor and the drum and adjusting the setting means to a previous setting so that the cutting wheel strikes the links and if the faceting is not satisfactory making an adjustment to correct an error and restarting the electric motor and the drum and adjusting the setting means so that the cutting wheel strikes the links.

17. The method of claim 13, wherein the step of turning on an electric motor involves turning on an electric motor that has one-half horsepower and has a variable r.p.m.

18. The method of claim 12, wherein the step of turning on an electric motor involves turning on an electric motor that has has between approximately 2000 and approximately 5000 revolutions per minute.

19. The method of claim 12, wherein the cutting wheel is fitted to an end of the arbor.

20. The method of claim 12, wherein the shaft is a double channel aluminum shaft.

21. The method of claim 12, wherein the pulley and the second pulley are half inch "V" pulleys.

22. An apparatus that can make facets on a jewelry chain that has a plurality of chain links that are either hollow or solid, comprising:
   an ice lathe including a rotatable drum and an advance mechanism
   a jewelry chain wound around the drum, said jewelry chain having a plurality of curved chain links that are either hollow or solid,
   an electric motor that is mounted on a flat platform, the platform adapted to the advance mechanism of the ice lathe, the electric motor fitted to turn a shaft, said shaft fitted with a pulley that can transmit a rotary motion of said shaft to an arbor fitted with a second pulley, said arbor held by bearings affixed to the platform, said arbor having affixed to it a cutting wheel, and said arbor positioned so that the cutting wheel is substantially perpendicular to the drum, the cutting wheel having a plurality of teeth,
   a rotation direction of the shaft determining a turning direction of the cutting wheel,
   an adjustment means for precisely setting a distance between the cutting wheel and the chain wound around the drum so that a forward rotary motion of the cutting wheel makes facets in a plurality of hollow links of the chain and a reverse rotary direction makes facets in a plurality of solid links of a chain.

23. The apparatus of claim 22, wherein the electric motor has one-half horsepower and has a variable number of revolutions per minute.

24. The apparatus of claim 22, wherein the electric motor has between approximately 2000 and approximately 5000 revolutions per minute.

25. The apparatus of claim 22, wherein the motor turns the shaft in a forward direction and wherein an outer wall edge of the teeth of the cutting wheel strikes the links.

26. The apparatus of claim 22, wherein the motor turns the shaft in a reverse direction and wherein a sharp edge of the teeth of the cutting wheel strikes the links.

27. An apparatus that can make facets on a jewelry chain that has a plurality of curved chain links that are either hollow or solid, comprising:
   an ice lathe including an advance mechanism and a rotatable drum, the drum having the jewelry chain wound around said drum,
   an electric motor that is mounted on a flat platform, the platform adapted to the advance mechanism of the ice lathe, the electric motor fitted to turn a shaft, said shaft fitted with a pulley that can transmit a rotary motion of said shaft to an arbor fitted with a second pulley, said arbor held by bearings affixed to the platform, said arbor having affixed to it a cutting wheel, and said arbor positioned so that the cutting wheel is substantially perpendicular to the drum, the cutting wheel having a plurality of teeth,
   a rotation direction of the shaft determining a turning direction of the cutting wheel,
   an adjustment means for precisely setting a distance between the cutting wheel and the chain wound around the drum so that a forward rotary motion of the cutting wheel makes facets in a plurality of hollow links of the chain and a reverse rotary direction makes facets in a plurality of solid links of a chain.

28. The apparatus of claim 27, wherein the electric motor has one-half horsepower and has a variable number of revolutions per minute.

29. The apparatus of claim 27, wherein the electric motor has between approximately 2000 and approximately 5000 revolutions per minute.

30. The apparatus of claim 27, wherein the motor turns the shaft in a forward direction and wherein an outer wall edge of the teeth of the cutting wheel strikes the links.

31. The apparatus of claim 27, wherein the motor turns the shaft in a reverse direction and wherein a sharp edge of the teeth of the cutting wheel strikes the links.

32. A new use for an electric motor that is mounted on a flat platform and fitted to turn a shaft that is fitted with a pulley that can transmit a rotary motion of said shaft to an arbor fitted with a second pulley, said arbor held by bearings affixed to the platform, said arbor transmitting the rotary motion to a cutting wheel that is affixed to the arbor, the new use allowing the apparatus to make facets on a jewelry chain that has a plurality of curved chain links that are hollow, comprising:
   (a) tightly winding the jewelry chain having a plurality of hollow curved chain links around a rotatable drum of an ice lathe that has an advance mechanism;
   (b) freezing the drum,
   (c) applying water to the chain upon the frozen drum until the water is frozen so that the chain is fixed in place,
   (d) adapting the platform to an advance mechanism of the ice lathe,
   (e) turning on the electric motor so that the electric motor turns the shaft in a forward direction and a forward rotary motion of said shaft is transmitted to the arbor and to the cutting wheel, and said arbor positioned so that the cutting wheel is substantially perpendicular to the drum and rotates in a forward direction, the cutting wheel having a plurality of teeth,
   (f) rotating the drum and activating the advance mechanism of the ice lathe, and
   (g) precisely setting a distance between the cutting wheel and the chain wound around the drum so that a forward rotary motion of the cutting wheel makes facets in each of a plurality of links of the chain.

33. The new use of claim 32, wherein an outer wall edge of the cutting wheel strikes each of the plurality of links.

34. The new use of claim 32, wherein the outer wall edge of the cutting wheel strikes each of the plurality of links multiple times.

35. The new use of claim 32, wherein by varying the diameter and quantity of teeth of the cutting wheel one can vary the size and shape of the facets made in each of the plurality of links.

36. The new use of claim 32, wherein the method includes an additional step of shutting off the electric motor and the drum, adjusting the setting means to move the cutting wheel from the links, closely examining one or more links that have been faceted, deciding if the faceting is satisfactory and if the faceting is satisfactory restarting the electric motor and the drum and adjusting the setting means to a previous setting so that the cutting wheel strikes the links and if the faceting is not satisfactory making an adjustment to correct an error and restarting the electric motor and the drum and adjusting the setting means so that the cutting wheel strikes the links.

37. The new use of claim 32, wherein the step of turning on an electric motor involves turning on an electric motor that has one-half horsepower and has a variable r.p.m.

38. The method of claim 32, wherein the step of turning on an electric motor involves turning on an electric motor that has has between approximately 2000 and approximately 5000 revolutions per minute.

39. The method of claim 32, wherein the cutting wheel is fitted to an end of the arbor.

40. The method of claim 32, wherein the shaft is a double channel aluminum shaft.

41. The method of claim. 32, wherein the pulley and the second pulley are half inch "V" pulleys.

* * * * *